United States Patent Office 3,234,218
Patented Feb. 8, 1966

3,234,218
NITROFURYLMETHYLIDENE HYDRAZIDES
Paul Schmidt, Therwil, and Kurt Eichenberger and Max Wilhelm, Basel, Switzerland, assignors to Ciba Corporation, a corporation of Delaware
No Drawing. Filed Jan. 3, 1961, Ser. No. 80,024
Claims priority, application Switzerland, Jan. 4, 1960, 113/60; Apr. 5, 1960, 3,804/60; Nov. 4, 1960, 12,365/60
10 Claims. (Cl. 260—240)

The present invention provides thiazole-carboxylic acid-N'-[5-nitrofuryl-(2)-methylidene]-hydrazides and, if desired salts thereof, and a process for their preparation.

The new compounds may be substituted in any desired manner. More especially the thiazole nucleus may contain further substituents; primarily, it may be substituted by unsubstituted or substituted hydrocarbon radicals, or by saturated or unsaturated heterocyclic or heterocyclic-aliphatic groups.

Hydrocarbon radicals are, for example, saturated or unsaturated aliphatic, alicyclic, alicyclic-aliphatic, araliphatic or aromatic hydrocarbon radicals, such as lower straight or branched alkyl or alkenyl radicals, for example methyl, ethyl, propyl, isopropyl, straight or branched radicals linked in any desired position, being butyl, pentyl, hexyl or heptyl, allyl or methallyl radicals, cycloalkyl or cycloalkenyl radicals such as cyclopentyl, cyclohexyl, cycloheptyl, cyclopentenyl, cyclohexenyl radicals, cycloalkyl- or alkenyl-alkyl radicals, such as cyclopentyl- or cyclohexenylmethyl, -ethyl or -propyl radicals, aralkyl- or aralkenyl- such as phenyl-methyl, -ethyl, -vinyl or -propyl radicals or aryl radicals, more especially phenyl radicals. Suitable heterocyclic or heterocyclic-aliphatic radicals are above all mono-nuclear ones, such as (if desired wholly or partially hydrogenated) pyridyl, pyrimidyl, pyridazyl, pyrazyl, furyl or thienyl groups and corresponding heterocyclic-alkyl radicals, such as pyridyl-, furyl-, or thienyl-methyl or -ethyl radicals.

As substituents of the aforementioned aliphatic radicals there may be mentioned more especially free or substituted hydroxyl, mercapto or amino groups in which the substituents are preferably of aliphatic nature, for example lower alkoxy, alkylmercapto or mono- or di-alkyl- or -cycloalkyl-amino groups, alkyleneamino, oxa-alkyleneamino, azaalkyleneamino or thialkyleneamino groups, such as methyl-, ethyl-, propyl-, butyl-, pentyl- or hexyl-oxy or -mercapto groups, methyl-, dimethyl-, ethyl-, diethyl-, propyl-, dipropyl-, N-methyl-N-propyl-, N-methyl-N-cyclopropyl-, butyl-, dibutyl-amino groups, pyrrolidino, piperidino, morpholino or piperazino groups, for example the piperazino, N-methylpiperazino or N-oxyethyl-piperazino group.

The aliphatic radicals may also be substituted by halogen atoms such as chlorine, bromine or iodine, the pseudohalogen trifluoromethyl, nitro groups, free or functionally converted carboxyl groups such as cyano, carbalkoxy or carbamyl groups, guanidino, ureido or thioureido groups, oxo, thiono or imino groups.

The alicyclic radicals may contain above all lower alkyl radicals.

Aromatic or heterocyclic radicals may contain above all halogen atoms or the abovementioned free or substituted hydroxyl, mercapto or amino groups, alkyl- or alkylene-dioxy, nitro groups or free or converted carboxyl groups. In the alicyclic-aliphatic, araliphatic and heterocyclic-aliphatic radicals both components may be substituted as described above.

When an oxo group is attached to the α-carbon atom of a substituting radical, the radical is that of a carboxylic acid, above all of a lower fatty acid, aralkane-carboxylic acid, heterocyclyl-alkane-carboxylic acid, aromatic or heterocyclic carboxylic acids which may be substituted in the manner described above. Particular mention deserve the acetic, propionic or butyric acid or substituted or unsubstituted benzoic or phenylacetic acids.

The heterocyclic nucleus may be further C-substituted, for example by halogen atoms, nitro, nitroso, free or substituted hydroxyl, mercapto or amino groups or free or functionally converted carboxyl groups, such, for example as those mentioned above or by a further carboxylic acid-N'-[5-nitrofuryl-(2)-methylidene]-hydrazide group.

Finally, the new compounds may also be substituted for example at the hydrazide nitrogen, above all by one of the aforementioned substituted or unsubstituted hydrocarbon or heterocyclic groups, more especially by alkyl.

From among carboxylic acids from which the new compounds may be derived there may be mentioned especially those of the formula

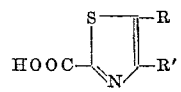

in which R represents a hydrogen or halogen atom or an alkyl or aryl group or a free or substituted amino group, and R' represents a hydrogen atom or an alkyl or aryl groups; those of the formula

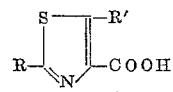

in which R represents a hydrogen atom or an alkyl or aryl group or a free or substituted amino-, hydroxyl or mercapto group and R' represents a hydrogen or halogen atom or an alkyl or aryl group or a free or substituted amino group; those of the formula

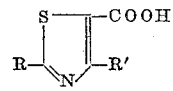

in which R represents a hydrogen atom or an alkyl or aryl group or a free or substituted amino, hydroxyl or mercapto group, and R' represents a hydrogen atom or an alkyl or aryl group.

As examples may be mentioned: 2:4-dimethylthiazole-5-carboxylic acid, 4-methylthiazole-5-carboxylic acid, 2-methylthiazole-4:5-dicarboxylic acid, 2-aminothiazole-4-carboxylic acid, 2-amino-4-methylthiazole-5-carboxylic acid, 2-hydroxy-4-methylthiazole-5-carboxylic acid, and 2-mercapto-4-methylthiazole-5-carboxylic acid.

The new compounds display a valuable antibacterial action, more especially towards cocci. They are also effective against trypanosomes, trichomonads or amoebae. They can therefore be used as chemotherapeuticals, for example for treating streptococcal, staphylococcal or protozoan infections in animals or humans. They are also active against colibacteria and can be used as urine-disinfectants. They can also be used as intermediates for the manufacture of medicaments.

Especially valuable are the compounds of the formula

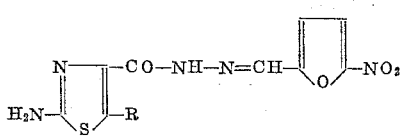

in which R stands for hydrogen or a lower alkyl radical, for example methyl, ethyl, propyl or butyl, and more especially 2-amino-thiazole-4-carboxylic acid-N'-(5-nitro-2-furfurylidene)-hydrazide.

The new compounds are prepared by methods known per se. Advantageously a thiazole-carboxylic acid hydrazide is condensed with a 5-nitrofuran-(2)-carbonyl compound, more especially with 5-nitrofuran-2-aldehyde, to form the hydrazone. This condensation is carried out in the usual manner, and the carbonyl group may also be in a reactively converted form. Thus it is possible to use, for example, acetals, thioacetals, oximes, bisulphite compounds or acylates of the carbonyl compounds.

The aforementioned reaction is preferably carried out in the presence of diluents and with heating.

The starting materials are known or can be made by methods known per se. If desired, they may be used in the form of salts thereof.

Depending on the reaction conditions and starting materials used the new compounds are obtained in the free form or in the form of salts thereof. The salts of the new compounds can be converted in the known manner into the free compounds, acid addition salts, for example, by reaction with a basic agent, or a metal salt if desired by reaction with an acid. On the other hand, a resulting acid compound can be converted into a salt by treatment with a basic agent, for example with a hydroxide or carbonate of an alkali metal such as sodium hydroxide or potassium carbonate; or a resulting free base on the other hand can be made into a salt with an inorganic or organic acid. Acid addition salts are advantageously prepared with therapeutically useful acids, for example hydrohalic acids, for example hydrochloric or hydrobromic acid, perchloric acid, nitric or thiocyanic acid, sulphuric or phosphoric acids, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicyclic, 4-aminosalicyclic, 2-phenoxybenzoic, 2-acetoxybenzoic, methanesulphonic, ethanesulphonic, hydroxy-ethanesulphonic, benzenesulphonic, paratoluenesulphonic, naphthalenesulphonic or sulphanilic acid, or methionine, tryptophan, lysine or arginine. The salts may be mono-salts or poly-salts.

The new compounds are intended to be used as medicaments in the form of pharmaceutical preparations containing them in admixture with an organic or inorganic solid or liquid pharmaceutical vehicle suitable for local, enteral (for example, oral) or parenteral administration. Suitable vehicles are substances that do not react with the new compounds, such for example as water, gelatine, lactose, starches, magnesium stearate, talc, vegetable oils, benzyl alcohols, gums, polyalkylene glycols, white petroleum jelly, cholesterol or other known medicinal vehicles. The pharmaceutical preparations may be, for example, tablets, dragées, capsules, or in liquid form, solutions, suspensions or emulsions. They may be sterilized and/or may contain assistants such as preservatives, stabilizers, wetting agents or emulsifiers, salts for regulating the osmotic pressure or buffers. They may also contain other therapeutically valuable substances. The new compounds may also be used as additives in animal feeds or in veterinary medicine.

The following examples illustrate the invention.

*Example 1*

A solution of 3.14 grams of 4-methylthiazole-2-carboxylic acid hydrazide and 2.85 grams of 5-nitrofuran-2-aldehyde in 200 cc. of ethanol is heated at the boil for one hour and then allowed to cool; the precipitate is recrystallized from much ethanol, to yield 4-methylthiazole-2-carboxylic acid-N'-(5-nitro-2-furfurylidene)-hydrazide of the formula

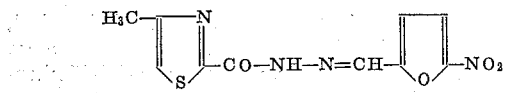

in yellow crystals melting at 266–268° C. with decomposition.

*Example 2*

A solution of 6 grams of 2-aminothiazole-4-carboxylic acid hydrazide and 5.4 grams of 5-nitrofuran-2-aldehyde in 200 cc. of ethanol is heated for 3 hours at the boil and then allowed to cool. The precipitate is crystallized from water+alcohol (1:2), to yield 2-aminothiazole-4-carboxylic acid-N'-(5-nitro-2-furfurylidene)-hydrazide of the formula

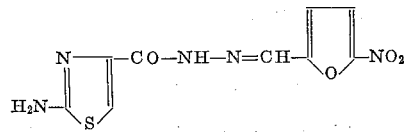

in yellow crystals melting at 260–262° C. with decomposition.

What we claim is:

1. A compound of the formula

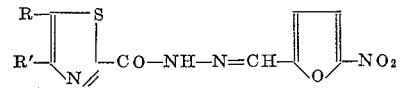

wherein R is a member selected from the group consisting of hydrogen, lower alkyl, phenyl, halogen, amino, mono- and di-lower alkylamino, mono-cyclo-lower-alkylamino, di-cyclo-lower-alkylamino, N-lower alkyl-N-cyclo-lower-alkylamino, pyrrolidino, piperidino, morpholino, piperazino, N-methyl-piperazino, and N-oxyethyl-piperazino, and R' is a member selected from the group consisting of hydrogen, lower alkyl and phenyl.

2. A compound of the formula

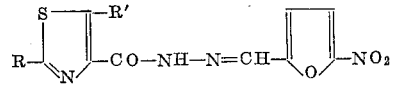

wherein R is a member selected from the group consisting of hydrogen, lower alkyl, phenyl, amino, mono- and di-lower alkylamino, mono-cyclo-lower-alkylamino, di-cyclo-lower-alkylamino, N-lower alkyl-N-cyclo-lower-alkylamino, pyrrolidino, piperidino, morpholino, piperazino, N-methyl-piperazino, and N-oxyethyl-piperazino, hydroxy, lower alkoxy, mercapto and lower alkylmercapto, and R' is a member selected from the group consisting of hydrogen, lower alkyl, phenyl, amino, mono- and di-lower alkylamino, mono-cyclo-lower-alkylamino, di-cycle-lower-alkylamino, N-lower alkyl-N-cyclo-lower-alkylamino, pyrrolidino, piperidino, morpholino, piperazino, N-methyl-piperazino, and N-oxyethyl-piperazino and halogen.

3. A compound of the formula

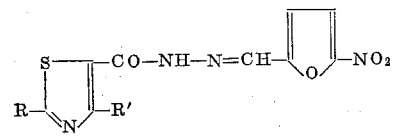

wherein R is a member selected from the group consisting of hydrogen, lower alkyl, phenyl, amino, mono- and di-lower alkylamino, mono-cyclo-lower-alkylamino, di-cyclo-lower alkylamino, N-lower alkyl-N-cyclo-lower-alkylamino, pyrrolidino, piperidino, morpholino, piperazino, N-methyl-piperazino, and N-oxyethyl-piperazino, hydroxy, lower alkoxy, mercapto and lower alkylmercapto, and R' is a member selected from the group consisting of hydrogen, lower alkyl and phenyl.

4. 4-methyl-thiazole-2-2carboxylic acid-N'-(5-nitro-2-furfurylidene)-hydrazide.

5. 2-amino-thiazole-4-carboxylic acid-N'-(5-nitro-2-furfurylidine)-hydrazide.

6. An acid addition salt of a compound of claim 1.
7. An acid addition salt of the compound of claim 4.
8. An acid addition salt of the compound of claim 5.
9. An acid addition salt of a compound of claim 2.
10. An acid addition salt of a compound of claim 3.

(References on following page)

References Cited by the Examiner

UNITED STATES PATENTS
2,992,225  7/1961  Dickson _____ 260–306.8

FOREIGN PATENTS
1,111,510  11/1955  France.
769,481  3/1957  Great Britain.
1,040,556  10/1958  Germany.

OTHER REFERENCES

Carrara et al., Gazz. Chim. Ital., volume 82, pages 652–662 (1952).

Carrara et al., Gazz. Chim. Ital., volume 83, pages 459 to 473 (1953).

Chemical Abstracts, volume 51, columns 5897 to 5899 (1957), abstract of Ozawa, Kyoto Daigaku Kekkahu Kenkyusho Nempo, volume 4, pages 256–299 (1956).

Dann et al., Chemische Berichte, volume 82, pages 83 to 86 (1949).

WALTER A. MODANCE, *Primary Examiner.*

DUVAL T. McCUTCHEN, IRVING MARCUS, JOHN D. RANDOLPH, *Examiners.*